July 20, 1948.   F. J. BINDA   2,445,555
LIGHT-POLARIZING POLYVINYL SHEET CONTAINING
POLYVINYL COMPOUND BORIC ACID COMPLEX
Filed April 16, 1945
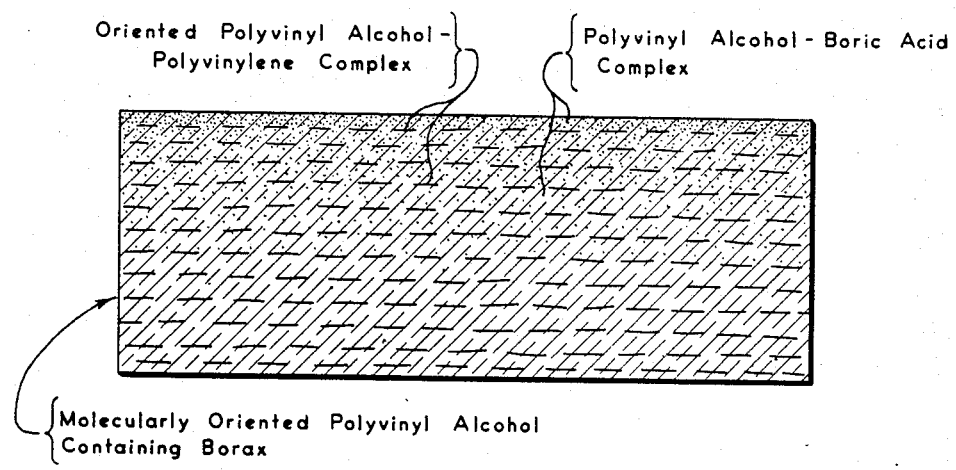
INVENTOR
Frederick J. Binda
BY Donald C. Brown
Attorney Patented July 20, 1948

2,445,555

UNITED STATES PATENT OFFICE 2,445,555

LIGHT-POLARIZING POLYVINYL SHEET CONTAINING POLYVINYL COMPOUND-BORIC ACID COMPLEX

Frederick J. Binda, Cambridge, Mass., assignor to Polaroid Corporation, Cambridge, Mass., a corporation of Delaware Application April 16, 1945, Serial No. 588,706

3 Claims. (Cl. 88—65)

This invention relates to a new and improved light-polarizing sheet comprising molecularly oriented polyvinyl alcohol containing oriented polyvinylene and having incorporated therewith a heat- and moisture-resistant complex of polyvinyl alcohol and boric acid.

It is one object of the present invention to improve the quality and properties of light-polarizing sheets or films of the type described in Patent No. 2,173,304, issued September 19, 1939, to E. H. Land and H. G. Rogers, and particularly to provide improvements on the process for forming such polarizing material described in Patent No. 2,255,940, issued September 16, 1941, to H. G. Rogers.

Another object of the invention is to provide a sheet of polarizing material wherein the polarizing properties derive from the presence of oriented molecules of polyvinylene, the sheet containing boron compound adapted to cross-link the molecules thereof.

Further objects are to provide a product wherein the polarizing sheet comprises a linear, polyvinyl oxy compound such particularly as polyvinyl alcohol and wherein said cross-linking agent comprises a solution of boric acid, and also to provide a cross-linking solution which contains also a compound such as an alkali adapted to inhibit the formation of additional polyvinylene in said sheet.

A still further object of the invention is to provide a polarizing sheet or film comprising a molecularly oriented polyvinyl oxy compound containing oriented molecules of polyvinylene and wherein a substantial portion of the material forming the body of said sheet has been converted to a cross-linked polyvinyl borate.

Still further objects are to provide a product as outlined above wherein said cross-linked material extends throughout the body of said sheet and also to provide such a product wherein said cross-linked material forms only an integral layer on one or both surfaces of the sheet.

Additional objects and advantages will in part appear and in part be pointed out in the course of the following detailed description of one or more embodiments of the invention, which are given as nonlimiting examples and are to be understood as illustrative of the practice of the invention.

For a fuller understanding of the invention, reference should be had to the following description, taken in connection with the accompanying drawing, which illustrates diagrammatically and in section a preferred embodiment of the invention.

In accordance with one embodiment of the invention a sheet of light-polarizing material may first be prepared substantially as described in the above-mentioned Land and Rogers patent. For example, a sheet of polyvinyl alcohol of the order of 0.005 inch in thickness may first be stretched, preferably under the influence of moderate heat, to orient the molecules therein. It is desirable that the degree of stretch be relatively high, such for example as to approximately six or more times the original length of the sheet. The sheet may then be treated to convert a portion thereof to polarizing molecules of polyvinylene. This may be done, for example, by heating the sheet for a period of from 10 to 15 minutes at a temperature of the order of 160° C. in the presence of a suitable dehydration catalyst such for example as an atmosphere of hydrogen chloride.

The next step is to treat the polarizing sheet with the desired cross-linking agent. A preferred method of carrying out this step is to soak the sheet in a solution containing said agent until it is thoroughly swelled and relaxed. Boric acid is a preferred cross-linking agent for the purposes of the invention, and it is also desirable to use a heated solution thereof. This not only has the advantage of shortening the time of treatment by speeding swelling of the sheet but also makes it possible to use more concentrated solutions than are obtainable at room temperature. Preferred results have been obtained with a water solution comprising approximately 9% boric acid and heated to a temperature of from 60 to 65° C. The time of treatment is not critical, a period of approximately three minutes being satisfactory for this example of the invention, and during this step the sheet may be permitted to shrink to preferably at least approximately one-half its previously stretched length or even as much as to its original unstretched length. The above step may then be followed by re-stretching the sheet to as nearly as possible the same degree as in the initial stretching operation. This second stretching step should be carried out while the sheet is still wet, since on drying it becomes quite brittle and non-thermoplastic. For example, the sheet may be stretched while in the boric acid solution, or the sheet may be transferred to a bath of plain water and the re-stretching operation carried out therein. The latter has the advantage of removing excess boric acid solution from the sheet and preventing precipitation on drying. Thereafter the re-stretched sheet should be thoroughly dried, as for example by baking at a moderate temperature such as 60 to 65° C.

The polarizing properties of the sheet produced in accordance with the foregoing example are very materially improved not only over the corresponding properties of said sheet prior to the boric acid treatment and re-stretch but also over the properties of a sheet prepared in the same way but relaxed and restretched only in water in accordance with the process described in the above noted Rogers patent. For example, prior to the boric acid treatment said sheet will have an overall transmission of the order of 22 to 25% for incident unpolarized light and not more than approximately 0.05% transmission for incident polarized light vibrating at right angles to its transmission axis. If the sheet is then relaxed in water and restretched as in the Rogers patent, its transmission for unpolarized light will increase to of the order of 33%, but when the shrinking step is carried out in the above boric acid solution, said transmission value will increase to of the order of 38 to 40% or more, while the crossed transmission will fall still lower. Furthermore, the stability of said material is very greatly improved, as will be explained.

It is believed that the reaction between polyvinyl alcohol and boric acid involves the condensation of each of the hydroxyl groups in the boric acid with a hydroxyl group of the polyvinyl alcohol to form water, and that the boron atoms then serve to cross-link adjacent carbon chains of the polyvinyl alcohol through the remaining oxygen atoms to form a polyvinyl borate. As already noted, the resulting material is relatively brittle and non-thermoplastic; it will retain its final stretched length and does not tend to shrink when heated as will the unborated sheet. Furthermore, when the unborated sheet is heated in air to temperatures of the order of 150° C., it gradually loses its polarizing properties, apparently as a result of oxidation and the saturating of the double bonds in the conjugated system of polyvinylene. A sheet prepared in accordance with the above example will withstand temperatures as high as 300° C. without losing its polarizing properties, although its transmission for polarized light will decrease as a result of prolonged heating at such temperatures, and it is believed that the cross-linked structure acts to seal out from the sheet the oxygen of the air which appears to be responsible for the bleaching of the unborated sheet under similar treatment. Treatment of the sheet in accordance with the above example also greatly increases its resistance to water, although it will tend to hydrolyze on prolonged soaking. Thus for example, the unborated sheet will be substantially swelled by water at room temperature in a period of the order of ten minutes, whereas a comparable degree of swelling of the borated sheet will require four hours or more. A still further desirable property of said sheet is that it shows substantially increased adhesion to readily available adhesive materials such particularly as incomplete polyvinyl acetals, polyvinyl butyral being a preferred example, and said materials are admirably suited for laminating said sheet between protective layers of glass or transparent organic resins.

The above noted darkening effect of very high temperatures on a polarizing sheet produced as described above is believed to be the result of further dehydration and the formation of additional polyvinylene, which is favored by the acidic condition imparted to the sheet by the boric acid combined therein. The same result will occur at lower temperatures such as 150° C. if said sheet is heated in the absence of air, as for example if the sheet is embodied in a lamination between glass plates and then subjected to heat. In accordance with the invention this result may be substantially prevented by embodying in the sheet a sufficient amount of any of a variety of suitable alkaline compounds. A convenient procedure is to modify the above-described example of the process of the invention to the extent of adding said alkali to the boric acid solution. Borax is a preferred material for this purpose, and the amount thereof to be added may be varied depending upon the use to which the sheet is to be put. For example, if the sheet is to be used in unlaminated condition or if it will not be subjected to very high temperatures, 1% borax will be sufficient, but this percentage should be increased in accordance with the severity of the intended conditions of use. Thus for example, a polarizing sheet produced in accordance with an embodiment of the above process wherein shrinking of the sheet is carried out at 65° C. in a solution comprising 9% boric acid and 5% borax, shows no appreciable alteration of its light-transmitting and light-polarizing properties, even after baking for a period of 72 hours at 150° C. If the borax concentration in the solution is further increased, a sheet treated therein will withstand still higher temperatures, and this is irrespective of whether said heating is in the presence of air or air is excluded as by embodying said sheet in a lamination. Borax is a preferred alkali for this purpose because it comprises the same element, boron, as boric acid and also because it appears to supplement the cross-linking effect of the boric acid, but many other alkalis may be used with equivalent results. For example, if 1% sodium hydroxide is added to the boric acid solution and the process carried out as outlined above, the resulting polarizing sheet will withstand the same tests as those indicated for a sheet treated in the boric acid solution containing 5% borax.

The preparation of the product of the present invention is subject to considerable variation within the principles of the invention. For example, the temperature of the boric acid solution may be varied from approximately room temperature to boiling, and the concentration thereof may be increased at the higher temperatures. It is desirable that the solution be heated at least to near 60° C. in order to accomplish rapid swelling of the sheet before the cross-linking takes place. Thus at room temperature, the cross-linked material tends to form a barrier layer adjacent the surface of the sheet which effectively resists further penetration by the solution, although it should be noted that the resulting sheet has substantially improved stability and constitutes one embodiment of the product of the invention. In another modification of the process the polarizing sheet may be merely held under strong tension and treated in the hot boric acid solution without restretching. After it is dried, the resulting sheet shows improved stability and dichroism although not to the same degree as when the sheet is restretched as described above. It should also be noted that the degree to which the sheet is stretched may be varied relatively widely, a three- or four-time stretch being adequate for some purposes and a ten-time stretch being obtainable if the sheet contains a plasticizer such, for example, as glycerine.

The concentration of the boric acid solution is of importance in obtaining the optimum degree of stability. It appears that under equilibrium conditions the percentage of boric acid which will combine with the sheet is constant for a given concentration, irrespective of temperature provided that the latter is sufficiently high to maintain said concentration in solution. For example, at 65° C. a 1% solution of boric acid will provide approximately 11% by weight of combined boric acid in a sheet treated as described in the above example. That is to say, 100 grams of said sheet material will on hydrolysis give approximately 11 grams of free boric acid. This compares with approximately 28% and 34%, respectively, for 5% and 9% solutions at the same temperature, and with a maximum of approximately 44%, which constitutes theoretically complete esterification and is obtainable with a boiling solution wherein the concentration of boric acid is 20% or more. When borax is included in the solution, this will alter the composition of the treated sheet. For example, when the treatment is carried out as described above in a solution at 65° C. comprising 9% boric acid and 1% borax, the sheet will comprise approximately 30% combined boric acid and approximately 1 to 1.5% borax. If the concentration of borax in the solution is raised to 5%, these figures will change to approximately 28% combined boric acid and approximately 3 to 3.5% borax. Further increase in the borax concentration will produce further change in these figures to, for example, approximately 23.5% boric acid and 11.5% borax for a solution at 65° C. containing 9% each of boric acid and borax. However, the presence of borax in the solution increases the solubility of boric acid therein at the same temperature, and the amount of combined boric acid in the sheet may thus be increased by increasing the concentration thereof in the solution.

The amount of combined boric acid to be retained in the sheet depends in part upon the use to which it is to be put, and particularly upon whether it is to be laminated or unlaminated. If the former, then the percentage should be kept to of the order of 5% to 10% in order to reduce the acidity of the sheet and the possibility of darkening as a result of further conversion to polyvinylene. This control of percentage is readily achieved by restretching in water as described above, which washes out the excess boric acid. It the sheet is to be used unlaminated, a greater amount of boric acid is desirable, with 5% being the approximate minimum and upwards of 30% being preferred. For either use the completely esterified sheet will be satisfactory, since it will possess maximum stability against oxidation in air and since it is not subject to dehydration in the absence of air by reason of the total elimination of hydroxyl groups in the esterification reaction.

The present invention is not limited to use with polyvinyl alcohol and may be practiced with other linear polyvinyl compounds capable of partial conversion to polarizing molecules of polyvinylene, particularly with mixed polymers and other derivatives of polyvinyl alcohol such as the acetals and ketals of polyvinyl alcohol. The term "polyvinylene" as used herein and in the claims is intended to describe polarizing molecules of the structure and configuration of those produced in accordance with the above noted Land and Rogers patent by alteration within a sheet of polyvinyl alcohol of the structure of certain of the molecules thereof. The term "acetals and ketals of polyvinyl alcohol" is to be understood as generic to the class of resins formed from polyvinyl acetate by the successive or combined steps of hydrolysis and condensation with aldehydes and ketones, respectively. It should be pointed out, however, that when the invention is practiced with mixed polymers or derivatives of polyvinyl alcohol, only incomplete derivatives should be used. That is to say, some of the hydroxyl groups of the polyvinyl alcohol should remain unreacted in order to enter into the subsequent esterification reaction.

It should be expressly understood that the present invention is not limited to the use of boric acid as the cross-linking agent, although it is a preferred material for a variety of reasons. Its reaction product with polyvinyl alcohol and polyvinyl alcohol derivatives is particularly suitable for the purposes of the invention. In addition to the advantages already noted, the reaction runs very smoothly at all temperatures with only water as solvent and can be readily controlled to any desired degree of completion. Of particular importance is the fact that not only do neither the reaction itself nor the conditions thereof decrease the polarizing properties of the sheet, but there is actually a substantial improvement in dichroism, as has already been noted. On the other hand, comparable results may be obtained with substituted boric acids and with other derivatives such as boron halides capable of esterifying an alcohol, in which case it will be apparent that the byproduct of the reaction will be a halogen acid.

Since certain modifications in the product which embodies the invention may be made without departing from its scope, it is intended that all matter contained in the above description shall be interpreted as illustrative and not in a limiting sense.

What is claimed is:

1. A light-polarizing sheet comprising a molecularly oriented linear polyvinyl alcohol, said sheet having an oriented dichroic polyvinyl alcohol-polyvinylene-complex incorporated therein, and a layer of a polyvinyl alcohol-boric acid-complex present on at least one surface of the sheet in a predetermined concentration and extending from said surface into the sheet in a progressively attenuated concentration, said polyvinyl alcohol-boric acid complex being heat and moisture resistant.

2. A light-polarizing sheet comprising a molecularly oriented linear polyvinyl alcohol, said sheet having an oriented dichroic polyvinyl alcohol-polyvinylene-complex incorporated therein, and a polyvinyl alcohol-boric acid-complex present throughout said sheet, said polyvinyl alcohol-boric acid complex being heat and moisture resistant.

3. A light-polarizing sheet comprising a molecularly oriented linear polyvinyl alcohol, said sheet having an oriented dichroic polyvinyl alcohol-polyvinylene complex incorporated therein and a layer of a polyvinyl alcohol-boric acid complex present on at least one surface of the sheet in a predetermined concentration and extending from said surface into the sheet in a progressively attenuated concentration, said polyvinyl alcohol-boric acid complex being heat and moisture resistant, said sheet containing at least one per cent of borax by weight.

FREDERICK J. BINDA.

(References on following page)

REFERENCES CITED

The following references are of record in the file of this patent:

UNITED STATES PATENTS

| Number | Name | Date |
|---|---|---|
| 2,072,302 | Hermann | Mar. 2, 1937 |
| 2,072,303 | Hermann | Mar. 2, 1937 |
| 2,125,374 | Herman et al. | Aug. 2, 1938 |
| 2,162,618 | Izard | June 13, 1939 |
| 2,169,250 | Izard | Aug. 15, 1939 |
| 2,173,304 | Land et al. | Sept. 19, 1939 |
| 2,255,940 | Rogers | Sept. 16, 1941 |
| 2,263,249 | Rogers | Nov. 18, 1941 |
| 2,300,074 | Strain | Oct. 27, 1942 |
| 2,326,539 | Irany | Aug. 10, 1943 |
| 2,327,872 | Dahle | Aug. 24, 1943 |
| 2,356,282 | Stamatoff | Aug. 22, 1944 |

OTHER REFERENCES

Jones: British Plastics—pages 77-83, February 1944.